(12) United States Patent
Liang

(10) Patent No.: US 9,122,717 B2
(45) Date of Patent: *Sep. 1, 2015

(54) SYSTEM AND METHOD OF DETECTING CACHE INCONSISTENCIES

(71) Applicant: Facebook, Inc., Menlo Park, CA (US)

(72) Inventor: Xiaojun Liang, San Jose, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/576,525

(22) Filed: Dec. 19, 2014

(65) Prior Publication Data

US 2015/0106342 A1    Apr. 16, 2015

Related U.S. Application Data

(63) Continuation of application No. 13/710,239, filed on Dec. 10, 2012, now Pat. No. 8,996,810.

(51) Int. Cl.
*G06F 12/08* (2006.01)
*G06F 17/30* (2006.01)

(52) U.S. Cl.
CPC ...... *G06F 17/30371* (2013.01); *G06F 12/0802* (2013.01); *G06F 12/0806* (2013.01); *G06F 12/0815* (2013.01); *G06F 12/0817* (2013.01); *G06F 17/30* (2013.01); *G06F 2212/45* (2013.01)

(58) Field of Classification Search
CPC .............. G06F 17/30; G06F 17/30371; G06F 12/0208; G06F 12/0806; G06F 12/0817; G06F 12/0815; G06F 2212/45
See application file for complete search history.

(56) References Cited

U.S. PATENT DOCUMENTS

| | | |
|---|---|---|
| 6,393,477 B1 | 5/2002 | Paxhia et al. |
| 6,449,695 B1 | 9/2002 | Bereznyi et al. |
| 6,453,404 B1 | 9/2002 | Bereznyi et al. |
| 6,535,916 B1 | 3/2003 | Nguyen |
| 6,564,213 B1 | 5/2003 | Ortega et al. |
| 6,760,812 B1 | 7/2004 | Degenaro et al. |
| 6,944,799 B1 | 9/2005 | Seeley et al. |
| 6,963,971 B1 | 11/2005 | Bush et al. |

(Continued)

OTHER PUBLICATIONS

Non-Final Office Action mailed Jul. 17, 2014, for U.S. Appl. No. 13/710,239, of Liang, X., filed Dec. 10, 2012.

(Continued)

*Primary Examiner* — Cheng-Yuan Tseng
*Assistant Examiner* — Rocio Del Mar Perez-Velez
(74) *Attorney, Agent, or Firm* — Perkins Coie LLP

(57) ABSTRACT

A system and method of detecting cache inconsistencies among distributed data centers is described. Key-based sampling captures a complete history of a key for comparing cache values across data centers. In one phase of a cache inconsistency detection algorithm, a log of operations performed on a sampled key is compared in reverse chronological order for inconsistent cache values. In another phase, a log of operations performed on a candidate key having inconsistent cache values as identified in the previous phase is evaluated in near real time in forward chronological order for inconsistent cache values. In a confirmation phase, a real time comparison of actual cache values stored in the data centers is performed on the candidate keys identified by both the previous phases as having inconsistent cache values. An alert is issued that identifies the data centers in which the inconsistent cache values were reported.

20 Claims, 9 Drawing Sheets

(56) References Cited

U.S. PATENT DOCUMENTS

| | | |
|---|---|---|
| 7,904,929 B1 * | 3/2011 | Jaunin et al. .................... 725/14 |
| 2002/0002607 A1 | 1/2002 | Ludovici et al. |
| 2002/0052884 A1 | 5/2002 | Farber et al. |
| 2003/0110360 A1 | 6/2003 | Nakajima |
| 2005/0086188 A1 | 4/2005 | Hillis et al. |
| 2007/0180194 A1 | 8/2007 | Graham et al. |
| 2007/0215685 A1 | 9/2007 | Self et al. |
| 2007/0263839 A1 | 11/2007 | Gandhi et al. |
| 2008/0010288 A1 | 1/2008 | Hinton et al. |
| 2010/0257137 A1 | 10/2010 | Escribano Bullon et al. |
| 2011/0307736 A1 | 12/2011 | George et al. |
| 2014/0067910 A1 | 3/2014 | Zhong et al. |

OTHER PUBLICATIONS

Notice of Allowance mailed Nov. 4, 2014, for U.S. Appl. No. 13/710,239, of Liang, X., filed Dec. 10, 2012.

* cited by examiner

SYSTEM AND METHOD OF DETECTING CACHE INCONSISTENCIES

CLAIM OF PRIORITY

This application is a Continuation of U.S. patent application Ser. No. 13/710,239, issued on Mar. 31, 2015, as U.S. Pat. No. 8,996,810, entitled "SYSTEM AND METHOD OF DETECTING CACHE INCONSISTENCIES," filed Dec. 10, 2012, which is expressly incorporated by reference herein.

BACKGROUND

Typically, data stored in a persistent database takes longer to retrieve than data stored in a random access memory (RAM) caching system. Caches can be used to store data recently retrieved from a database. Subsequent user requests for the same data can be retrieved more quickly from cache and also lightens the database load.

For a large social networking service that uses multiple data centers to support requests for data from millions of users, or in one case, billions of users, it is important to maintain cache consistency across data centers. Inconsistent data caching can result in users being served stale data, which results in a non-ideal user experience. Further, if inconsistent data is found in the system, it can be an indication of a larger software and/or hardware problem. Thus, it would be beneficial to have a method available for detecting cache inconsistencies.

BRIEF DESCRIPTION OF THE DRAWINGS

Examples of a method and system for detecting cache inconsistencies among distributed data centers are illustrated in the figures. One or more embodiments of the present disclosure are illustrated by way of example and not limitation in the figures of the accompanying drawings.

DETAILED DESCRIPTION

A system and method of detecting cache inconsistencies among distributed data centers is described. Key-based sampling captures a complete history of a key for comparing cache values across data centers. In a first phase of a cache inconsistency detection algorithm, a log of operations performed on a sampled key is compared in reverse chronological order for inconsistent cache values to identify candidate inconsistent keys. In a second phase, a log of operations performed on a candidate inconsistent key, as identified in the first phase, is evaluated in near real time in forward chronological order for inconsistent cache values to verify the candidate inconsistent key. In a third phase, a real time comparison of actual cache values stored in the data centers is performed on the verified candidate keys to eliminate a false positive candidate inconsistent key. An alert is issued that identifies the data centers in which the inconsistent cache values were reported.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1:
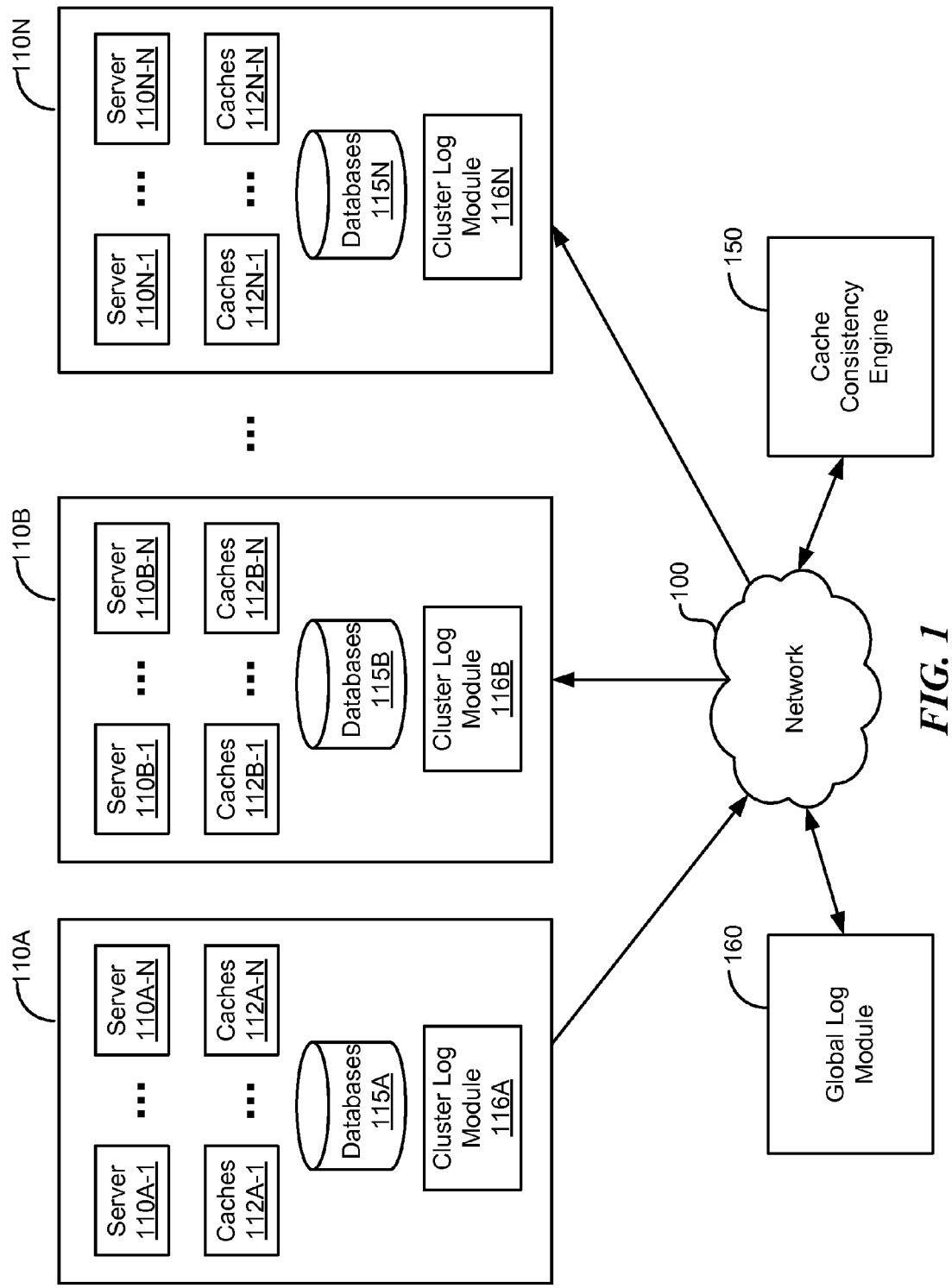
FIG. 1 depicts a block diagram of an example system in which cache inconsistency detection techniques are implemented according to an embodiment of the present disclosure.

FIG. 1 depicts a block diagram of an example master-slave system in which cache inconsistency detection techniques can be advantageously implemented. The system includes multiple data centers 110A, 110B, . . . 110N, where one of the data centers 110A is the master data center, and the rest of the data centers 110B . . . 110N are slave data centers. The slave data centers 110B . . . 110N are used only for reading data from the respective databases 115B . . . 115N, not for writing data to the databases. User requests that modify a data object in a database, such as writes and deletes, are sent to the master data center 110A to update the master databases 115A, and the changes are then propagated out to the slave databases 115B . . . 115N in the slave data centers 110B . . . 110N.

The data centers 110A, 110B, . . . 110N, a cache consistency engine 150, and a global log module 160 are coupled via a network 100. The network 100 can be any collection of distinct networks operating wholly or partially in conjunction to provide connectivity to the data centers 110A, 110B, . . . 110N, the cache consistency engine 150, and the global log module 160 and may appear as one or more networks to the data centers 110A, 110B, . . . 110N and cache consistency engine 150, and the global log module 160. In one embodiment, communications to and from the data centers 110A, 110B, . . . 110N, the cache consistency engine 150, and the global log module 160 can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

Each data center, whether a master data center or slave data center, typically has multiple web servers for responding to user requests. For example, master data center 110A has web servers 110A-1 ... 110A-N, and slave data center 110B has web servers 110B-1 ... 110B-N. In one embodiment, each web server has a corresponding cache for caching data in memory to reduce the number of times the data must be read from the database and to speed up the time it takes to serve a particular requested data object to a user if the data has been requested recently, either by the same user or a different user. For example, caches 112A-1 ... 112A-N correspond to web servers 110A-1 ... 110A-N, respectively, in the master data center 110A. Similarly, each of the slave data centers 110B ... 110N has multiple web servers and corresponding caches. In another embodiment, the caches in a data center are shared by the web servers in the same data center.

When a web server, e.g. 110A-1, receives a data request, it first checks for the data in cache, e.g. 112A-1. If the cache has the requested data, the web server sends the data from the cache to the user. If the cache does not have the requested data, the web server will search in the local databases, e.g. 115A, in the data center for the requested data and send the data to the user.

In certain embodiments with only a single data center, when a user modifies a data object stored in a database, the modified value is written to the database, and the old value is deleted from the cache. Then if the user or another user requests that data object, it is retrieved from the database and written to the cache. For subsequent requests for the data object, the web server will find it in the cache until purged, e.g., the data object expires from the cache or is deleted from the cache as a result of another modification of the data object, or the cache being full. Thus, with only a single data center, data modifications can be handled in a straightforward manner with respect to the cache so that cache inconsistency issues do not arise.

In contrast, when there are multiple data centers, for example, a master data center and one or more slave data centers, data modifications are initiated at the master data center, and the updates are then propagated to the slave data centers. The finite amount of time that it takes for updates to be replicated at the slave data centers can give rise to cache inconsistencies. In one scenario, if the user modifies a data object, the pre-modified value for the data object can be deleted from both the caches in the master data center and the caches in the slave data centers. But if a user requests the data object from the slave data center after the object has been deleted from the slave data center cache, but before the modified data object has been replicated in the slave database, the pre-modified data object is put in cache again, and the next request for the data object will be served the pre-modified data object because the web server will find the pre-modified data object in cache and never even check the slave database for the updated data object. This is one example of a scenario that can cause cache inconsistency to arise.

In other scenarios, delay of updates from the master data center to the slave data centers may occur due to software problems or hardware problems, such as when a slave database goes down. If the slave database goes down, the slave data center will serve stale data objects until the slave database is up and running again and has a chance to process data updates from the master data center.

The system in FIG. 1 includes a global log module 160 that receives and merges log modules from each data center into a global log. The global log module 160 chronologically orders all of the received log entries from each data center in the global log.

The system in FIG. 1 also includes a cache consistency engine 150 that can perform checks for detecting cache inconsistencies. The cache consistency engine 150 can execute a cache inconsistency detection algorithm on selected keys. The algorithm will be described more fully below.

Key-Based Sampling

A data object is stored in a cache by assigning the value of the data object a unique cache key that can be used to identify cache value stored for the data object in the cache. A user can send requests to a web server for setting or reading the cache value for a data object corresponding to a particular key.

When a system's data centers serve a large number of users, an extremely large number of data read and write requests are received from users by the system. Thus, it is not feasible to check every single data request to determine whether inconsistent data is being cached. Many sampling techniques exist for large scale web sites. For example, randomly selected user requests can be sampled. This technique is useful for detecting fan-out issues where a single request generates a large number if subsequent queries, for example, requesting all the friends or friends' friends' information.

However, sampling based upon user requests is not very useful for cache consistency monitoring because the complete history of a sampled key should be captured to compare the cache values corresponding to the key across data centers. If a key is captured for a particular user, and then another user performs an action on the same key, and that action is not captured, the system will not be able to determine the reason the value for the key is inconsistent in the caches. For example, for a multi-player online game, if the system needs to know the location of the users, the location key for two players from the same town would be the same. Then if sampling is performed based on the user, the second user can modify the location key without that information being captured. In contrast, if the system performs key-based sampling, any activity that attaches to the key is sampled, independent of the user who performed the activity. As long as the key is accessed by a user, the history of the activity relating to the key should be logged and analyzed. Once the entire history relating to a key is recorded, it can be analyzed to determine if there is an inconsistency, and which data center the inconsistency originated from.

Figure 2:
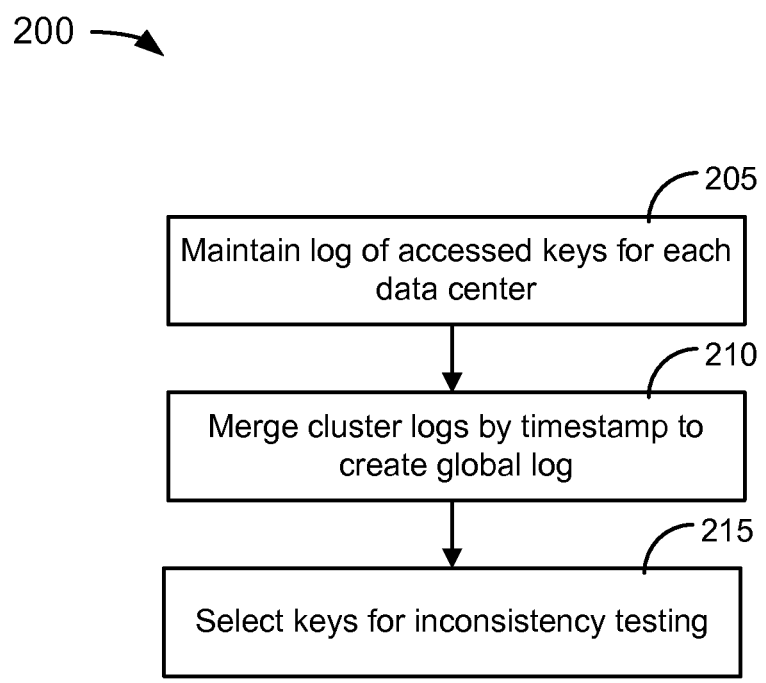
FIG. 2 is a flow diagram illustrating an example process for selecting keys for sampling according to an embodiment of the present disclosure.

FIG. 2 is a flow diagram illustrating an example process 200 for selecting keys for sampling. At block 205, at each data center, a cluster log module 116A, 116B, ... 116N maintains a log of each key that a user accesses in the data center cluster, whether through a read request or write request. Log entries can include a timestamp of the user request, the key, the requested operation, the hash value of the key using a predetermined hash function, and the data center that the request was received at. The hash values of the keys are stored in the log rather than the actual values of the keys because it is less expensive to compare hash values than actual strings of actual values. In one embodiment, each database maintains its own log entries, and the cluster log module merges the individual database logs into a cluster log. In one embodiment, the cluster log is directly maintained by the cluster log module for all the databases in the cluster.

Then at block 210, the system merges the logs from each cluster to create a global log. The log entries from the cluster logs are merged together chronologically according to each entry's timestamp. Thus, the global log is a chronological history of every key acted upon by a user throughout every data center in the system. In one embodiment, the global log maintains a rolling history of log entries, for example, the global log can automatically delete entries older than a certain time, such as twenty-four hours.

Next, at block 215, the system selects particular keys to be tested for inconsistent cache values. In one embodiment, the system executes a pre-selected hash function on each key. The hash function maps a key to its associated hash value, and with a well-selected hash function, the hash values of all of the system keys are well distributed over the possible range of values. In one embodiment, a key is selected if the hash function of the key has a value that has a remainder of zero when divided by one million, i.e., hash(key) % 1,000,000=0. The remainder and the divisor can be selected to be any value that results in a reasonable percentage of keys being identified as candidates for investigation with the cache consistency test algorithm. Because the total number of system keys is extremely large, the total number of keys with inconsistent cache values can be approximated by the divisor times the total number of sampled keys that have inconsistent cache values, i.e. 1,000,000 times the number of sampled keys with inconsistent cache values for the example given above. Other functions can also be used for selecting keys.

The criteria for selecting keys include selecting a number of keys for sampling that can reasonably be tested with a near real time algorithm. Thus, if there are a billion keys, the selection function should not result in half of the keys being selected for testing because there are too many keys for testing. Further, the selection criteria include selecting a sufficiently meaningful number of keys for testing to determine if there is a problem with the system. In other words, if only a single key is selected for testing, and the key is identified to have a cache inconsistency, 100% of the sampled keys have a cache consistency problem, but the data set is too small to be meaningful. If 20 keys are selected for testing, and only two of the sampled keys show a cache consistency problem, then 10% of the sampled keys are problematic.

Once the candidate keys to be tested have been identified, the system executes an algorithm to determine whether a key has inconsistent data stored in cache.

Phase 1

The cache inconsistency detection algorithm has three phases to minimize likelihood that false positive inconsistent keys are identified. However, not all three phases are necessarily performed. Phase 1 of the algorithm is performed on the global log of key activity for a selected key to determine whether there are any inconsistencies in the cached hash values of the key. The global log can be stored for any arbitrary period of time, for example, the global log can be a rolling log that stores all new entries and automatically deletes any entries older than 24 hours. Note that phase 1 is performed offline, thus, phase 1 does not have an impact on the system's response to user requests.

Figure 3:
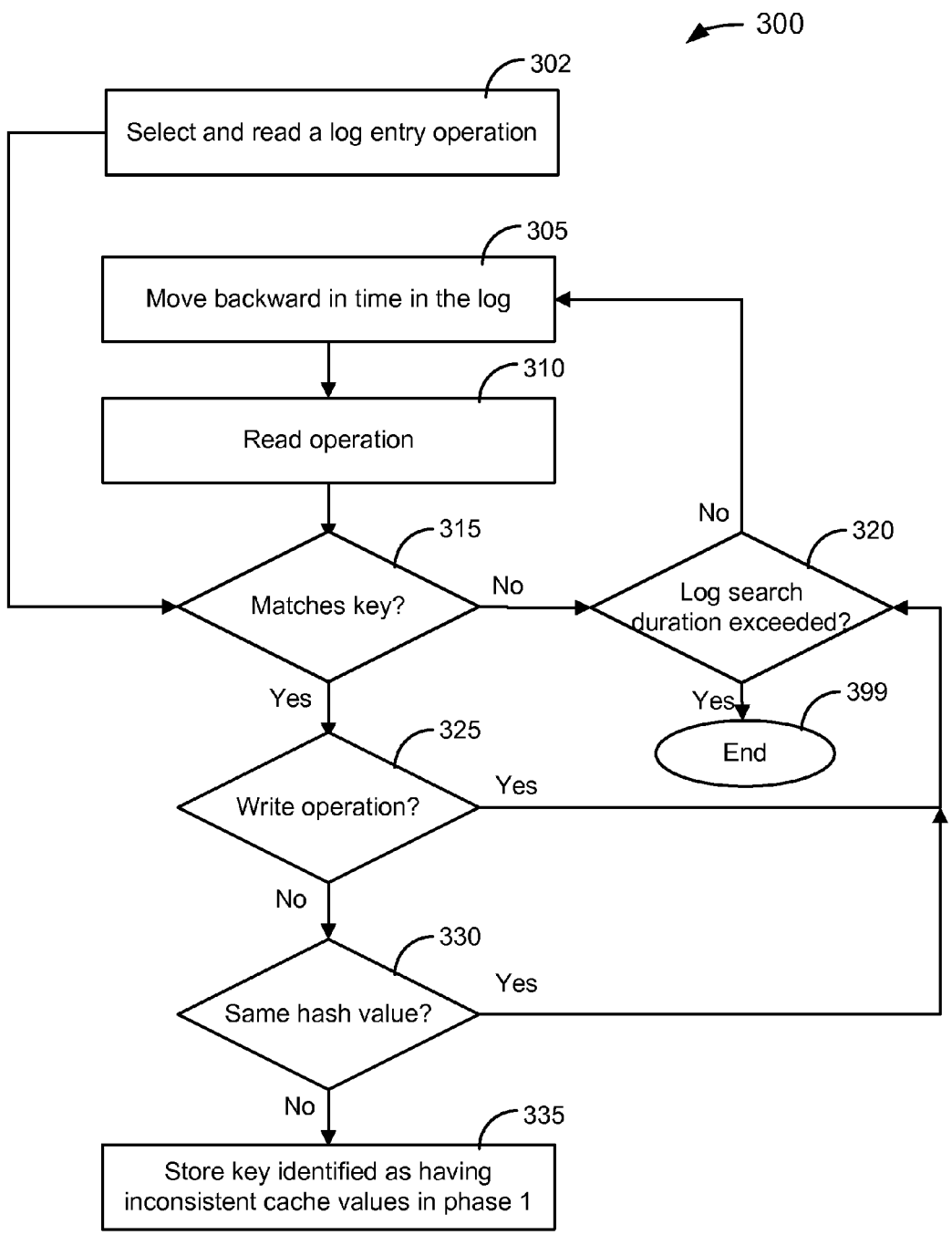
FIG. 3 is a flow diagram illustrating an example process for identifying inconsistent key candidates in phase 1 of a cache inconsistency detection algorithm according to an embodiment of the present disclosure.

FIG. 3 is a flow diagram illustrating an example process 300 for identifying key candidates with inconsistent cache values, also referred to herein as inconsistent keys, in phase 1 of a cache inconsistency detection algorithm. At block 302, a log entry in the global log is selected and read. The log entry can be selected arbitrarily from the global log entries, as long as there is at least a predetermined log search duration available in the global log preceding the timestamp of the selected log entry. Then at decision block 315, the system determines if the selected log entry operation corresponds to the key to be investigated, as selected by the process 200 described in FIG. 2 above.

If the log entry does not match the key being evaluated (block 315—No), at decision block 320, the system determines if a phase 1 predetermined log search duration has been exceeded. For example, the predetermined log search duration can be selected to be ten minutes. Then, log entries having a timestamp within ten minutes prior to the timestamp of the first selected operation chosen at block 302 are evaluated. Log entries having a timestamp older than ten minutes prior to the timestamp of the first selected operation are not evaluated. If the log search duration has been exceeded (block 320—Yes), the evaluation is complete for the key, and the process ends at block 399.

If the log search duration has not been exceeded (block 320—No), at block 305, the system moves backward chronologically to the previous log entry in the global log. Then at block 310, the system reads the operation of the log entry and proceeds to decision block 315 as before.

If the log entry matches the key being evaluated (block 315—Yes), then at decision block 325, the system determines if the operation in the log entry is a write operation that modified the value of the key. For a write operation, the stored hash value of the key is expected to change. However, because it is unknown what the hash value should change to, the evaluation process cannot use this hash value for determining if the stored cache values for the key are inconsistent. Only if the operation is a read operation, does the system compare the hash value for the log entry to a prior known hash value because the value of the key is not expected to change for a read operation. If the operation is a write operation (block 325—Yes), the process continues to decision block 320 to determine if the log search duration has been exceeded.

If the operation is a read operation (block 325—No), at decision block 330, the system determines if the stored hash value of the log entry is the same as the last known hash value. A change in the stored hash values for a read operation is a sign that there is an inconsistent cache value because a read operation should not change the hash value of the key. If the hash value is unchanged (block 330—Yes), or if the hash value for the key is the first one identified in the log entry table so that there is no prior hash value to compare to, the process returns to decision block 320 to determine if the log search duration has been exceeded.

If the hash value is different than the last accessed hash value for the key (block 330—No), at block 335 the key is identified as a candidate for having inconsistent cache values for phase 1 of the algorithm and stored. Phase 1 of the algorithm for the key is complete. Process 300 is repeated for any other keys to be investigated, as selected by the process 200 described in FIG. 2 above. Then phase 2 of the algorithm is executed for each key identified as a candidate for having inconsistent cache values.

Phase 2

Figure 4:
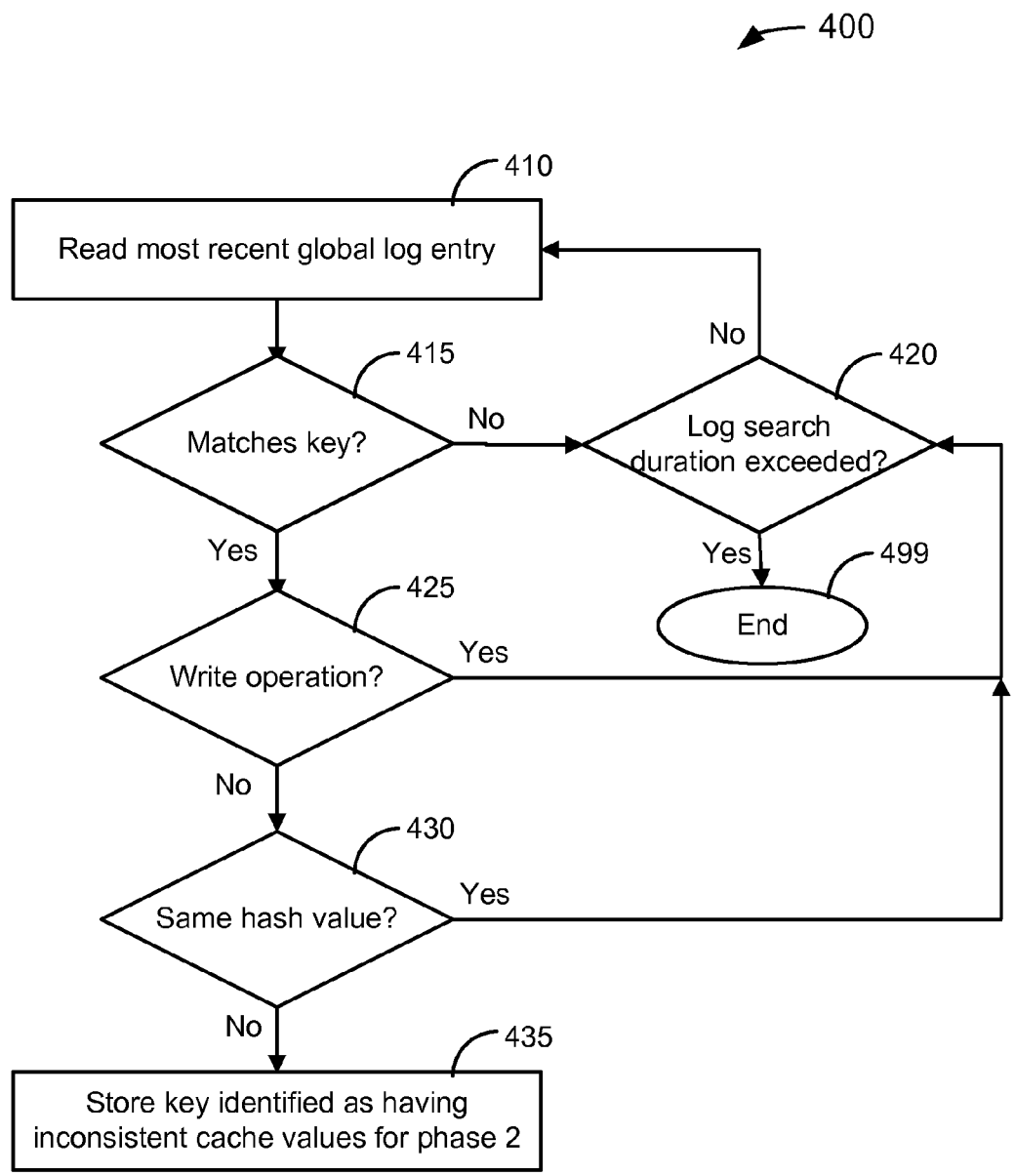
FIG. 4 is a flow diagram illustrating an example process for identifying inconsistent key candidates in phase 2 of the cache inconsistency detection algorithm according to an embodiment of the present disclosure.

Only the keys that were identified in phase 1 as having inconsistent cache values are further processed in phase 2 of the cache inconsistency detection algorithm. Phase 2 of the algorithm performs another check as to whether the identified candidate keys do indeed have inconsistent cache values using a near real time process. FIG. 4 is a flow diagram illustrating an example process 400 for identifying inconsistent key candidates in phase 2 of the cache inconsistency detection algorithm.

At block 410, the most recent log entry in the global log is selected. The global log is updated with log entries from the cluster logs in nearly real time, so phase 2 of the algorithm can be performed on the new global log entries in nearly real time. Then at decision block 415, the system determines if the log entry operation corresponds to the candidate key to be investigated, as selected by the process 300 described in FIG. 3 above.

If the log entry does not match the key being evaluated (block 415—No), at decision block 420, the system determines if a phase 2 predetermined log search duration has been exceeded. For example, the predetermined log search duration can be selected to be five minutes. Then, log entries having a timestamp within five minutes after the timestamp of the first selected operation chosen at block 410 are evaluated. Log entries having a timestamp beyond five minutes of the timestamp of the first selected operation are not evaluated. This log search duration is used in case the key is not accessed further by users. Then the system does not waste time looking for a match to the key. The phase 2 log search duration can be set to be different from the phase 1 log search duration. If the log search duration has been exceeded (block 420—Yes), the evaluation is complete for the key, and the key is not considered further as an inconsistent key candidate. The process ends at block 499.

If the log search duration has not been exceeded (block 420—No), at block 410, the system moves chronologically forward to read the next log entry in the global log and proceeds to decision block 415 as before.

If the log entry matches the key being evaluated (block 415—Yes), then at decision block 425, the system determines if the operation in the log entry is a write operation that modified the value of the key. As with phase 1, for a write operation, the hash value of the key is expected to change. However, because it is unknown what the hash value should change to, the evaluation process searches for the next log entry that matches the key. If the operation is a write operation (block 425—Yes), the process continues to decision block 420 to determine if the log search duration has been exceeded.

Only if the log entry operation is a read operation, does the system compare the hash value for the log entry to a prior known hash value because the value of the key is not expected to change for a read operation. If the operation is a read operation (block 425—No), at decision block 430, the system determines if the hash value of the log entry is the same as the last known hash value. If the hash value is unchanged (block 430—Yes), or if the hash value for the key is the first one identified in the log entry table so that there is no prior hash value to compare to, the process returns to decision block 420 to determine if the log search duration has been exceeded.

If the hash value is different than the last accessed hash value for the key (block 430—No), at block 435 the key is confirmed as a candidate inconsistent key having inconsistent cache values for phase 2 of the algorithm. Phase 2 of the algorithm for the key is complete. Process 400 is repeated for other candidate keys to be investigated, as selected by the process 300 described in FIG. 3 above. Then phase 3 of the algorithm is executed for each candidate key confirmed in phase 2 as being a candidate inconsistent key.

Phase 3

Figure 5:
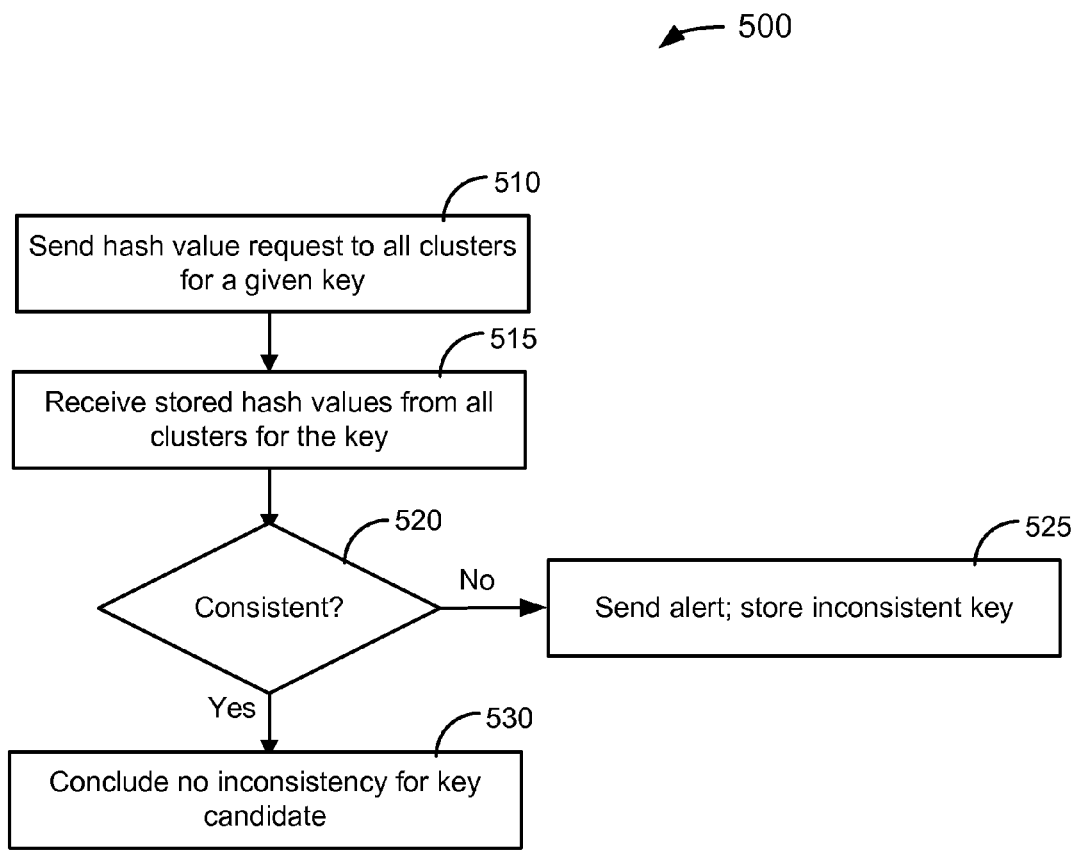
FIG. 5 is a flow diagram illustrating an example process for performing a check of inconsistent key candidates in phase 3 of the cache inconsistency detection algorithm according to an embodiment of the present disclosure.

Even though phases 1 and 2 of the algorithm have been performed on the keys to identify candidate inconsistent keys, there is still the possibility that an identified candidate inconsistent key might be a false positive. Thus, phase 3 of the algorithm performs a final real-time check on the key candidates identified by phases 1 and 2. FIG. 5 is a flow diagram illustrating an example process 500 for performing a check of inconsistent key candidates in phase 3 of the cache inconsistency detection algorithm.

At block 510, the system sends a request to each of the data center clusters for the hash value stored in the cache for a specific candidate key identified by phase 1 and phase 2. The query is a real time query.

At block 515, the system receives the hash values for the candidate key from each of the clusters. Then at decision block 520, the system compares the received hash values for the key to determine whether the cluster values are all consistent.

If the hash values are inconsistent among the received hash values (block 520—No), at block 525, the system sends an alert. The alert can be any type of alert, such as email or text message, and can include information about the particular data center or data centers for which the inconsistency has been confirmed. The system can also store the confirmed inconsistent keys and information relating to the keys at block 525. The data center information can be used to help determine the cause of a cache inconsistency problem. For example, if multiple inconsistent keys are identified where the inconsistent cache values originated from the same data center, the solution for the problem can be focused on whether something unusual has recently occurred at that data center, such as software testing.

If the hash values are consistent (block 520—Yes), at block 530, the system concludes that the key does not have any inconsistent cache values and a false positive was identified by phases 1 and 2 of the algorithm.

Because phase 3 involves a significant amount of overhead for performing a real time query, which can be quite expensive, the number of phase 3 queries should be limited. In one embodiment, only a small percentage of inconsistent keys identified by phase 1 and phase 2 are selected for a real time check in phase 3. For example, if ten real time check queries are issued in phase 3, and eight of the ten keys are verified as having inconsistent values, the effectiveness of phases 1 and 2 would be 80%. Thus, using statistical probabilities, the system can determine whether all of the candidates identified in phases 1 and 2 should be checked in phase 3.

While the cache inconsistency detection algorithm has been described as having three distinct phases, not all three phases need to be performed to detect inconsistent cache values. For example, either phase 1 or phase 2 can be skipped, and the algorithm will still be useful for detecting inconsistent keys.

Figure 6:
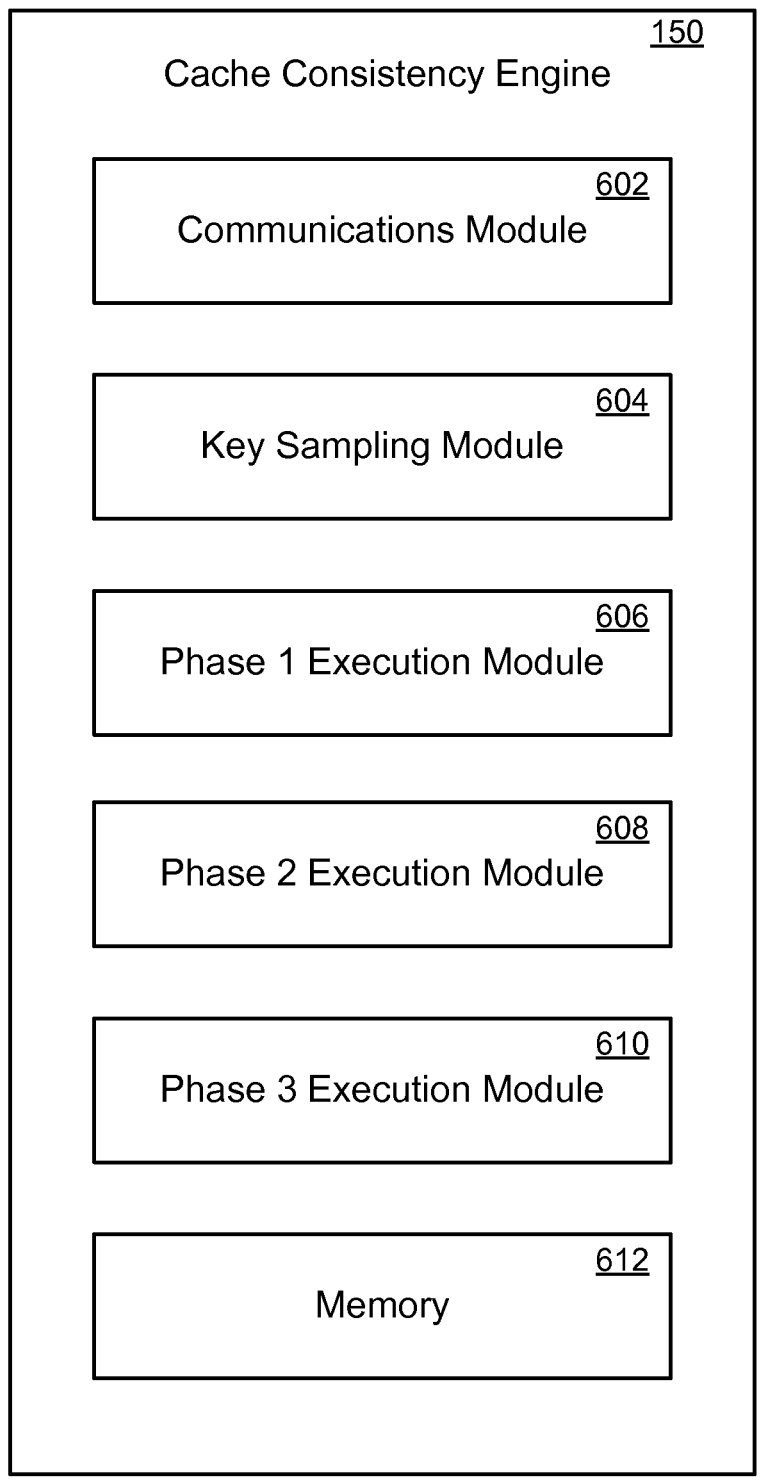
FIG. 6 depicts an exemplary architecture of a cache consistency engine according to an embodiment of the present disclosure.

FIG. 6 is an example of an architecture of the cache consistency engine 150 configured, for example, to execute the cache inconsistency detection algorithm. In the example of FIG. 6, the cache consistency engine 150 (and all of the elements included within the cache consistency engine 150) is implemented by using programmable circuitry programmed by software and/or firmware, or by using special-purpose hardwired circuitry, or by using a combination of such embodiments.

In the example of FIG. 6, the cache consistency engine 150 includes a communications module 602, a key sampling module 604, a phase 1 execution module 606, a phase 2 execution module 608, a phase 3 execution module 610, and a memory 612. Additional or fewer components or modules can be included in the cache consistency engine 150 and each illustrated component.

As used herein, a "module" or "engine" includes a general purpose, dedicated or shared processor and, typically, firmware or software modules that are executed by the processor. Depending upon implementation-specific or other considerations, the module can be centralized or its functionality distributed. The module or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, the cache consistency engine 150 includes a communications module 602 configured to query the global log module 160 for log entries, and to query the data centers for real time cache values for certain keys. The communications module 602 is also configured to send alerts when a key is identified as having inconsistent cache values.

In one embodiment, the cache consistency engine 150 includes a key sampling module 604 configured to execute a pre-selected hash function on each key and to determine select keys for inconsistent cache value testing.

In one embodiment, the cache consistency engine 150 includes a phase 1 execution module 606 configured to execute phase 1 of the cache inconsistency detection algorithm, including reading global log entries, determining whether a log entry operates on a selected key, determining whether the log entry operation is a read or write operation, and determining whether the hash value has changed for a read operation. The phase 1 execution module 606 works in conjunction with the communications module 602 to request log entries from the global log module 160. The phase 1 execution module 606 also works in conjunction with the memory 612 to store candidate keys identified as having inconsistent cache values in phase 1.

In one embodiment, the cache consistency engine 150 includes a phase 2 execution module 608 configured to execute phase 2 of the cache inconsistency detection algorithm, including reading global log entries, determining whether a log entry operates on a selected key, determining whether the log entry operation is a read or write operation, and determining whether the hash value has changed for a read operation. The phase 2 execution module 608 works in conjunction with the communications module 602 to request log entries from the global log module 160. The phase 2 execution module 608 also works in conjunction with the memory 612 to store candidate keys identified as having inconsistent cache values in phase 2 and to retrieve for testing candidate keys identified as having inconsistent cache values in phase 1.

In one embodiment, the cache consistency engine 150 includes a phase 3 execution module 610 configured to execute phase 3 of the cache inconsistency detection algorithm, including comparing cache values received from each cluster for a particular key. The phase 3 execution module 610 works in conjunction with the communications module 602 to request and review hash values from data centers for an inconsistent key to be tested and to send an alert if an inconsistent key is confirmed to have inconsistent cache values. The phase 3 execution module 610 also works in conjunction with the memory 612 to store confirmed inconsistent keys.

In one embodiment, the cache consistency engine 150 includes a memory 612 configured to store log entries received from the global log module 160, real time cache values received from the data centers, inconsistent key candidates identified in phases 1 and 2, and confirmed inconsistent keys identified in phase 3. The information stored in the memory 612 can be used by the other modules in the cache consistency engine 150.

Figure 7:
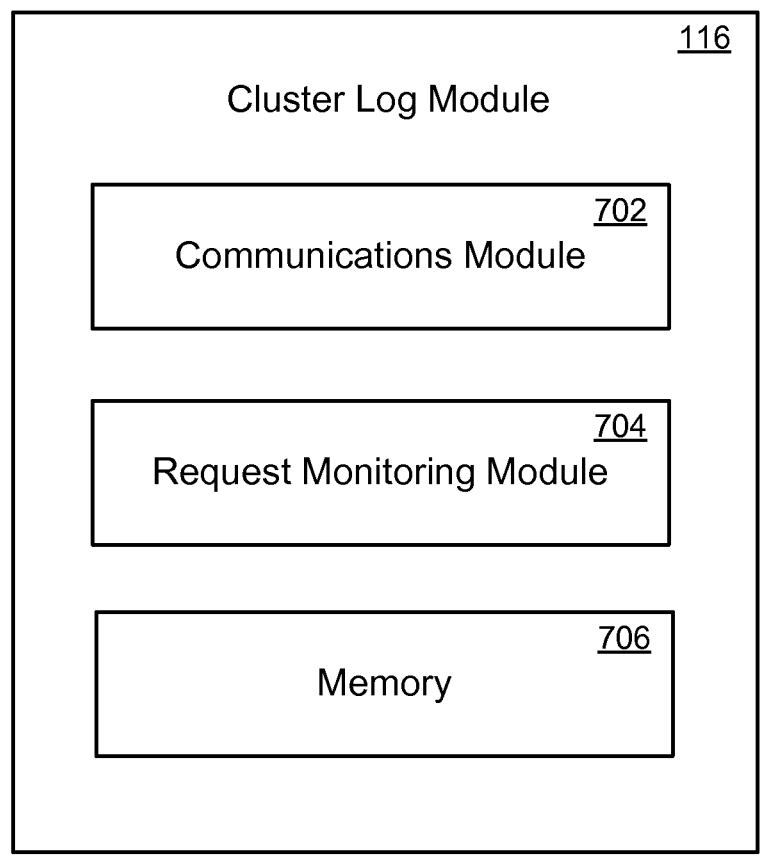
FIG. 7 depicts an exemplary architecture of a cluster log module according to an embodiment of the present disclosure.

FIG. 7 is an example of an architecture of the cluster log module 116A, 116B, . . . 116N configured, for example, to maintain a cluster log of each key accessed in its data center by a user. In the example of FIG. 7, the cluster log module 116A, 116B, . . . 116N (and all of the elements included within the cluster log module 116A, 116B, . . . 116N) is implemented by using programmable circuitry programmed by software and/or firmware, or by using special-purpose hardwired circuitry, or by using a combination of such embodiments.

In the example of FIG. 7, the cluster log module 116A, 116B, . . . 116N includes a communications module 702, a request monitoring module 704, and a memory 706. Additional or fewer components or modules can be included in the cluster log module 116A, 116B, . . . 116N and each illustrated component.

In one embodiment, the cluster log module 116A, 116B, . . . 116N includes a communications module 702 configured to send the cluster log to the global log module 160, receive hash value queries from the cache consistency engine 150, and send hash values for a specified key to the cache consistency engine 150.

In one embodiment, the cluster log module 116A, 116B, . . . 116N includes a request monitoring module 704 configured to monitor read and write requests received from users and to log the keys that are accessed by the user requests along with relevant information for each request. The request monitoring module 704 works in conjunction with the memory 706 to store the cluster log entries. The information stored in the memory 706 can also be used by the communications module 702.

Figure 8:
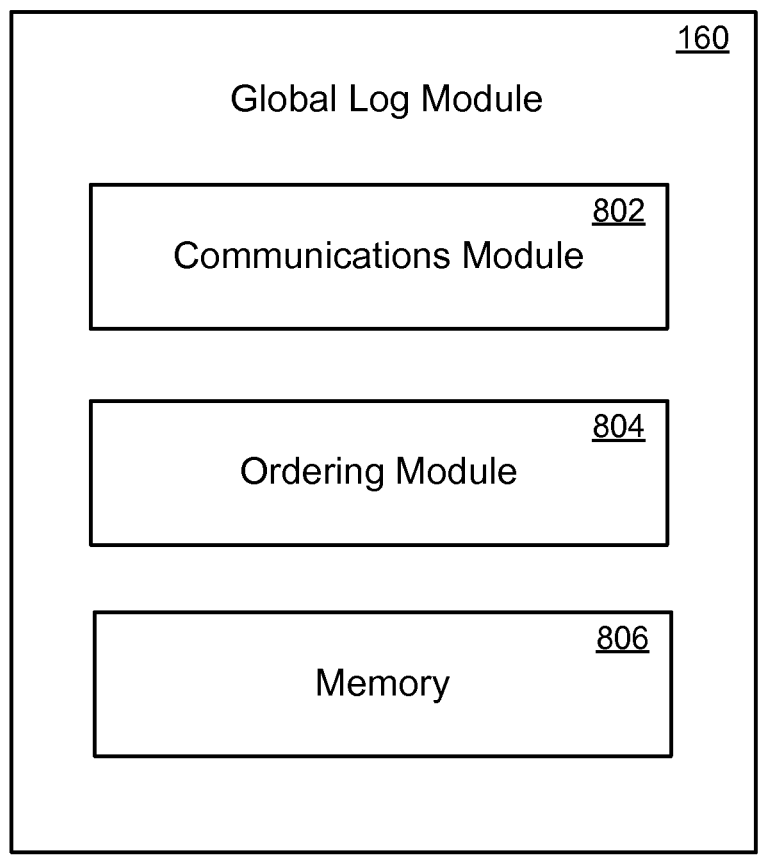
FIG. 8 depicts an exemplary architecture of a global log module according to an embodiment of the present disclosure.

FIG. 8 is an example of an architecture of the global log module 160 configured, for example, to generate and maintain a global log of all keys accessed in every data center of the system by a user. In the example of FIG. 8, the global log module 160 (and all of the elements included within the global log module 160) is implemented by using programmable circuitry programmed by software and/or firmware, or by using special-purpose hardwired circuitry, or by using a combination of such embodiments.

In the example of FIG. 8, the global log module 160 includes a communications module 802, an ordering module 804, and a memory 806. Additional or fewer components or modules can be included in the global log module 160 and each illustrated component.

In one embodiment, the global log module 160 includes a communications module 802 configured to receive a cluster log from each of the clusters, to receive log entry queries from the cache consistency engine 150, and to send log entries to the cache consistency engine 150.

In one embodiment, the global log module 160 includes an ordering module 804 configured to chronologically order the log entries in the cluster logs to generate a global log of each key acted upon by a user in the system. The ordering module 804 works in conjunction with the memory 806 to store the ordered global log. The information stored in the memory 806 can also be used by the communications module 802.

Figure 9:
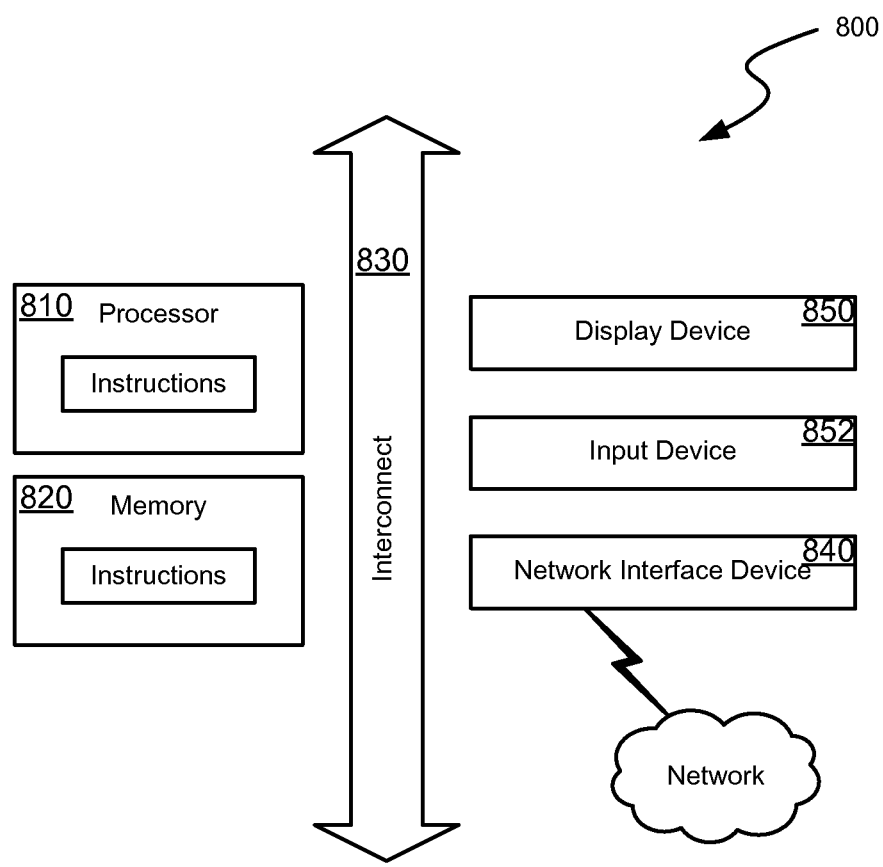
FIG. 9 is a block diagram showing an example of the architecture for a processing system that can be utilized to implement the cache inconsistency detection techniques according to an embodiment of the present disclosure.

FIG. 9 is a block diagram showing an example of the architecture for a system 800 that can be utilized to implement the techniques described herein. The system 800 can reside in the cache consistency engine, global log module, or cluster log module. In FIG. 9, the system 800 includes one or more processors 810 and memory 820 connected via an interconnect 830. The interconnect 830 is an abstraction that represents any one or more separate physical buses, point to point connections, or both connected by appropriate bridges, adapters, or controllers. The interconnect 830, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 810 can include central processing units (CPUs) that can execute software or firmware stored in memory 820. The processor(s) 810 may be, or may include, one or more programmable general-purpose or special-purpose microprocessors, digital signal processors (DSPs), programmable, application specific integrated circuits (ASICs), programmable logic devices (PLDs), or the like, or a combination of such devices.

The memory 820 represents any form of memory, such as random access memory (RAM), read-only memory (ROM), flash memory, or a combination of such devices. In use, the memory 820 can contain, among other things, a set of machine instructions which, when executed by processor 810, causes the processor 810 to perform operations to implement embodiments of the present invention.

Also connected to the processor(s) 810 through the interconnect 830 is a network interface device 840. The network interface device 840 provides the system 800 with the ability to communicate with remote devices, and may be, for example, an Ethernet adapter or Fiber Channel adapter.

The system 800 can also include one or more optional input devices 852 and/or optional display devices 850. Input devices 852 can include a keyboard, a mouse or other pointing device. The display device 850 can include a cathode ray tube (CRT), liquid crystal display (LCD), or some other applicable known or convenient display device.

Conclusion

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶ 6 will begin with the words "means for.") Accordingly, the applicant reserves the right to add additional claims after filing the application to pursue such additional claim forms for other aspects of the invention.

I claim:

1. A non-transitory computer-readable storage medium storing instruction that, when executed by a computing system, cause the computing system to perform operations comprising:

capturing a log comprising a plurality of log entries, each log entry corresponding to one of a plurality of data requests, wherein each data request includes a key that identifies a stored requested data object,
  wherein each selected log entry corresponding to a selected data request includes:
    an indication, as a requested key, of the key included in the selected data request, and
    an indication of a value associated with the requested key that was provided in response to the selected data request; and
  performing a key-based analysis on the log to identify an inconsistency for a given key,
    wherein the key-based analysis comprises determining that, for the given key, the indication of the value associated with the given key in at least one log entry is different from the indication of the value associated with the given key in at least one other log entry.

2. The computer-readable storage medium of claim 1, wherein the indication of the value included in each selected log entry is a hash value of the value associated with the requested key.

3. The computer-readable storage medium of claim 2, wherein the operations further comprise verifying the inconsistency by:
  obtaining all of the plurality of log entries that include the given key; and
  comparing the hash values of the obtained log entries.

4. The computer-readable storage medium of claim 1, wherein:
  each selected log entry further includes an indication of an operation type of the data request corresponding to that selected log entry; and
  the key-based analysis on the log comprises analyzing only individual log entries where the operation type of each of the individual log entries amounts to a read operation.

5. The computer-readable storage medium of claim 1, wherein the plurality of log entries are obtained by merging log entries from a plurality of cluster logs maintained for a plurality of data centers; and
  wherein each selected log entry includes an identification of one of the plurality of data centers that the selected log entry originated from.

6. The computer-readable storage medium of claim 5, wherein the operations further comprise sending an alert about the inconsistency; and
  wherein the alert includes an identification of the one of the plurality of data centers identified in the at least one of the log entries.

7. The computer-readable storage medium of claim 1, wherein each selected log entry includes: a time stamp when the data request was received, an indication of an operation on the requested key specified in the data request, and an indication of a data center where the data request was received.

8. The computer-readable storage medium of claim 7, wherein the analysis on the log comprises analyzing only individual log entries where the time stamp of each of the individual log entries is within a specified time span.

9. The computer-readable storage medium of claim 1, wherein:
  the plurality of data requests are serviced by a plurality of data centers;
  the plurality of data centers include at least one master data center and multiple slave data centers;
  write requests are sent to the at least one master data center; and
  changes to data stored in the at least one master data center are propagated to at least one of the multiple slave data centers.

10. The computer-readable storage medium of claim 1, wherein the operations further comprise verifying the inconsistency by:
  requesting and receiving, from multiple data centers of a plurality of data centers, a current value associated with the given key;
  comparing received values associated with the given key from the multiple data centers;
  determining that at least one of the received values associated with the given key is inconsistent with at least one other of the received values associated with the given key; and
  based on the determining, verifying the inconsistency.

11. A method for identifying a cache inconsistency, comprising:
  capturing a log comprising a plurality of log entries, each log entry corresponding to one of a plurality of data requests, wherein each data request identifies a requested data object,
    wherein each selected log entry corresponding to a selected data request comprises the identification of the requested data included in the selected data request and an indication of a value that was provided in response to the selected data request; and
  performing an analysis on the log to identify the cache inconsistency by:
    comparing multiple of the plurality of log entries; and
    based on the comparing, determining that, for a given identification of requested data, the value that was provided in response to a particular first data request with the given identification of requested data is different from the value that was provided in response to a particular second data request with the given identification of requested data.

12. The method of claim 11, wherein:
  each indication of the value that was provided in response to each selected data request is a hash value of the value that was provided in response to that selected data request; and
  wherein the method further comprises verifying the cache inconsistency by:
    obtaining all of the plurality of log entries that include the given identification of requested data; and
    comparing the hash values of the obtained log entries.

13. The method of claim 11 further comprising verifying the cache inconsistency by:
  requesting and receiving, from multiple data centers of a plurality of data centers, a current value associated with the given identification of requested data;
  comparing received values associated with the given identification of requested data from the multiple data centers;
  determining that at least one of the received values associated with the given identification of requested data is inconsistent with at least one other of the received values associated with the given identification of requested data; and
  based on the determining, verifying the cache inconsistency.

14. The method of claim 11, wherein:
  each selected log entry further includes an indication of an operation type of the data request corresponding to that selected log entry; and
  the analysis on the log comprises analyzing only individual log entries where the operation type of each of the individual log entries amounts to a read operation.

15. The method of claim 11,
wherein the plurality of log entries are obtained by merging log entries from a plurality of cluster logs maintained for a plurality of data centers; and
wherein each selected log entry includes an identification of one of the plurality of data centers that the selected log entry originated from.

16. The method of claim 15, further comprising sending an alert about the cache inconsistency, wherein the alert includes an identification of the one of the plurality of data centers identified in the at least one of the plurality of log entries.

17. The method of claim 11, wherein:
each selected log entry includes: a time stamp when the data request was received, an indication of an operation type on the requested data, and an indication of a data center where the data request was received; and
the analysis on the log comprises analyzing only individual log entries where the time stamp of each of the individual log entries is within a specified time span.

18. The method of claim 11, wherein:
the plurality of data requests are serviced by a plurality of data centers;
the plurality of data centers include at least one master data center and multiple slave data centers;
write requests are sent to the at least one master data center; and
changes to data stored in the at least one master data center are propagated to at least one of the multiple slave data centers.

19. A system for identifying a cache inconsistency, comprising:
a memory;
one or more processors;
a log comprising a plurality of log entries, each log entry corresponding to one of a plurality of data requests, wherein each data request includes a key that identifies a requested data object,
wherein each selected log entry corresponding to a selected data request includes:
an indication, as a requested key, of the key included in the selected data request, and
an indication of a value associated with the requested key that was provided in response to the selected data request; and
a log analyzer configured to perform an analysis on the log to identify an inconsistency for a given key,
wherein the analysis comprises determining that, for the given key, the indication of the value associated with the given key in at least one log entry is different from the indication of the value associated with the given key in at least one other log entry.

20. The system of claim 19, further comprising an inconsistency verifier configured to:
request and receive, from multiple data centers of a plurality of data centers, a current value associated with the given key;
compare received values associated with the given key from the multiple data centers;
determine that at least one of the received values associated with the given key is inconsistent with at least one other of the received values associated with the given key; and
based on the determining, verify the inconsistency.

* * * * *